United States Patent
Bouldin et al.

(10) Patent No.: US 8,070,092 B2
(45) Date of Patent: Dec. 6, 2011

(54) NOISE-SUPPRESSING STRUT SUPPORT SYSTEM FOR AN UNMANNED AERIAL VEHICLE

(75) Inventors: Bruce Dan Bouldin, Phoenix, AZ (US); Ricardo Burdisso, Blacksburg, VA (US)

(73) Assignee: Honeywell International Inc., Morristown, NJ (US)

( * ) Notice: Subject to any disclaimer, the term of this patent is extended or adjusted under 35 U.S.C. 154(b) by 495 days.

(21) Appl. No.: 12/262,428

(22) Filed: Oct. 31, 2008

(65) Prior Publication Data
US 2010/0108809 A1   May 6, 2010

(51) Int. Cl.
*B64C 39/06* (2006.01)

(52) U.S. Cl. .................................... 244/34 A

(58) Field of Classification Search .......... 244/1 N, 244/12.6, 34 A, 54, 53 R, 7 B, 23 A, 23 C
See application file for complete search history.

(56) References Cited

U.S. PATENT DOCUMENTS

| | | | |
|---|---|---|---|
| 3,017,139 A | | 1/1962 | Binder |
| 3,148,847 A | * | 9/1964 | Manificat ............... 244/17.17 |
| 3,568,358 A | * | 3/1971 | Bruce ....................... 446/37 |
| 4,326,681 A | * | 4/1982 | Eshoo ....................... 244/30 |
| 4,371,133 A | | 2/1983 | Edgley |
| 4,544,115 A | | 10/1985 | Edgley |
| 4,657,209 A | | 4/1987 | Edgley |
| 4,664,340 A | | 5/1987 | Jackson |
| 5,575,438 A | | 11/1996 | McGonigle et al. |
| 5,746,391 A | * | 5/1998 | Rodgers et al. ............ 244/54 |
| 6,016,991 A | * | 1/2000 | Lowe, Jr. .................... 244/5 |
| 6,050,520 A | * | 4/2000 | Kirla ....................... 244/23 A |
| 6,170,778 B1 | | 1/2001 | Cycon et al. |
| 6,270,038 B1 | | 8/2001 | Cycon et al. |
| 6,422,508 B1 | | 7/2002 | Barnes |
| 6,450,445 B1 | * | 9/2002 | Moller ..................... 244/23 A |
| 6,502,787 B1 | | 1/2003 | Barrett |
| 6,575,402 B1 | | 6/2003 | Scott |
| 6,588,701 B2 | | 7/2003 | Yavnai |

(Continued)

FOREIGN PATENT DOCUMENTS

EP    1868008    12/2007

(Continued)

OTHER PUBLICATIONS

Heidelberg et al., A Unique Ducted Fan Test Bed for Active Noise Control and Aeroacoustics Research, NASA Technical Memorandum 107213, AIAA-96-1740.

*Primary Examiner* — Richard Price, Jr.
(74) *Attorney, Agent, or Firm* — Shumaker & Sieffert, P.A.

(57) ABSTRACT

A strut support system for a ducted fan unmanned aerial vehicle to suppress noise comprising: a ducted fan fuselage that defines an opening; an engine that extends longitudinally through the opening in the fuselage; a drive mechanism rotatably mounted to the engine, wherein a fan is mounted on the drive mechanism within a duct defined by the opening; and a plurality of struts extending between the ducted fan fuselage and the engine each comprising a first leg and a second leg joined together by a curvilinear junction, wherein the first leg is attached to the ducted fan fuselage and the second leg is attached to the engine, wherein the plurality of struts are positioned upstream of the fan, wherein the junction between the first leg of each of the plurality of struts and the ducted fan fuselage is outside the highlight of the ducted fan fuselage's leading edge.

20 Claims, 4 Drawing Sheets

U.S. PATENT DOCUMENTS

| | | | |
|---|---|---|---|
| 6,604,706 B1 | 8/2003 | Bostan | |
| 6,607,162 B2 | 8/2003 | Warsop et al. | |
| 6,622,090 B2 | 9/2003 | Lin | |
| 6,634,593 B2 * | 10/2003 | Lepretre et al. | 244/7 B |
| 6,665,594 B1 | 12/2003 | Armstrong | |
| 6,672,538 B2 | 1/2004 | Millea et al. | |
| 6,694,228 B2 | 2/2004 | Rios | |
| 6,698,685 B2 * | 3/2004 | Walmsley | 244/23 C |
| 6,712,312 B1 | 3/2004 | Kucik | |
| 6,813,559 B1 | 11/2004 | Bodin et al. | |
| 6,845,942 B2 | 1/2005 | Paul | |
| 6,847,865 B2 | 1/2005 | Carroll | |
| 6,873,886 B1 | 3/2005 | Mullen et al. | |
| 6,974,106 B2 | 12/2005 | Churchman | |
| 7,000,883 B2 | 2/2006 | Mercadal et al. | |
| 7,044,422 B2 | 5/2006 | Bostan | |
| 7,158,877 B2 | 1/2007 | Carlsson et al. | |
| 7,228,227 B2 | 6/2007 | Speer | |
| 7,231,294 B2 | 6/2007 | Bodin et al. | |
| 7,289,906 B2 | 10/2007 | Van Der Merwe et al. | |
| 7,299,130 B2 | 11/2007 | Mulligan et al. | |
| 7,302,316 B2 | 11/2007 | Beard et al. | |
| 7,841,563 B2 * | 11/2010 | Goossen et al. | 244/175 |
| 2005/0165517 A1 | 7/2005 | Reich | |
| 2006/0102780 A1 | 5/2006 | Parks | |
| 2006/0106506 A1 | 5/2006 | Nichols et al. | |
| 2006/0177306 A1 | 8/2006 | Parker et al. | |
| 2006/0192047 A1 | 8/2006 | Goossen | |
| 2006/0248873 A1 | 11/2006 | Parks et al. | |
| 2006/0287824 A1 | 12/2006 | Lin | |
| 2007/0018052 A1 | 1/2007 | Eriksson | |
| 2007/0069083 A1 | 3/2007 | Shams et al. | |
| 2007/0129855 A1 | 6/2007 | Coulmeau | |
| 2007/0200027 A1 | 8/2007 | Johnson | |
| 2007/0221790 A1 | 9/2007 | Goossen et al. | |
| 2007/0271032 A1 | 11/2007 | Cheng et al. | |
| 2008/0023587 A1 | 1/2008 | Head et al. | |
| 2008/0035786 A1 | 2/2008 | Bilyk et al. | |
| 2008/0059068 A1 | 3/2008 | Strelow et al. | |
| 2008/0071431 A1 | 3/2008 | Dockter et al. | |
| 2008/0078865 A1 | 4/2008 | Burne | |

FOREIGN PATENT DOCUMENTS

| | | |
|---|---|---|
| WO | 2007058643 | 5/2007 |

* cited by examiner

# NOISE-SUPPRESSING STRUT SUPPORT SYSTEM FOR AN UNMANNED AERIAL VEHICLE

GOVERNMENT RIGHTS

The United States government may have certain rights in this invention pursuant to Government Contract #W56HZV-05-C-0724 with the U.S. Army (TACOM).

BACKGROUND OF THE INVENTION

In ducted fan unmanned aerial vehicles (UAVs), struts are used to provide structural support between the duct and the center body. The flow induced by the fan into the duct produces noise due to a number of flow and structure interaction mechanisms. One of the most dominant noise sources in ducted fan UAVs is the strut-induced flow disturbance that interacts with the fan's rotors. The two primary strut-induced flow disturbances are: (1) the wakes produced by air flowing over each strut and (2) the counter-rotating vortices generated at the strut-duct junction. These two sources of noise hinder the stealth characteristic of ducted fan UAVs, which could result in premature location of the vehicle due to an excessive noise signature. Thus, being able to reduce the noise generated by the ducted fan will allow UAVs to be utilized in more military and stealth applications.

A ducted fan UAV relies on a significant volume of airflow through the duct to generate the needed lift for the vehicle to fly. As such, significant structural support is needed in the duct to hold the fan centered in the duct and to support the engine. The design and placement of these support struts, thus, is critical to not only the structural integrity of the vehicle but also to the acoustic and noise performance of the ducted fan. The conventional approach to implement the struts is to place them inside the duct in a radial straight configuration. This configuration is particularly loud.

Further, for a UAV, such as a micro-air vehicle (MAV) or Class I vehicle, the center of gravity must be centered in front of or above the duct lip. This requires that significant weight be centered above the vehicle duct and that structural elements be in place to support that weight. In the MAV, those structural supports or struts are located in the full flow of the duct stream, generating significant noise.

SUMMARY OF THE INVENTION

The discovery presented herein outlines a strut support system for a ducted fan unmanned aerial vehicle that has a beneficial effect of suppressing noise.

Thus, in one aspect, the present invention provides a strut support system for a ducted fan unmanned aerial vehicle to suppress noise, comprising: (a) a ducted fan fuselage that defines an opening, (b) a centerbody that extends longitudinally through the opening in the fuselage, wherein the centerbody comprises (1) an engine, (2) a drive mechanism rotatably mounted to the engine, and (3) a fan mounted on the drive mechanism, and (c) a plurality of struts extending between the ducted fan fuselage and the centerbody, each comprising a first leg and a second leg joined together by a curvilinear junction, wherein the first leg is attached to the ducted fan fuselage and the second leg is attached to the engine, wherein the plurality of struts are positioned upstream of the fan, and wherein the junction between the first leg of each of the plurality of struts and the ducted fan fuselage is outside the highlight of the ducted fan fuselage's leading edge.

DETAILED DESCRIPTION OF THE PREFERRED EMBODIMENT

Figure 1:
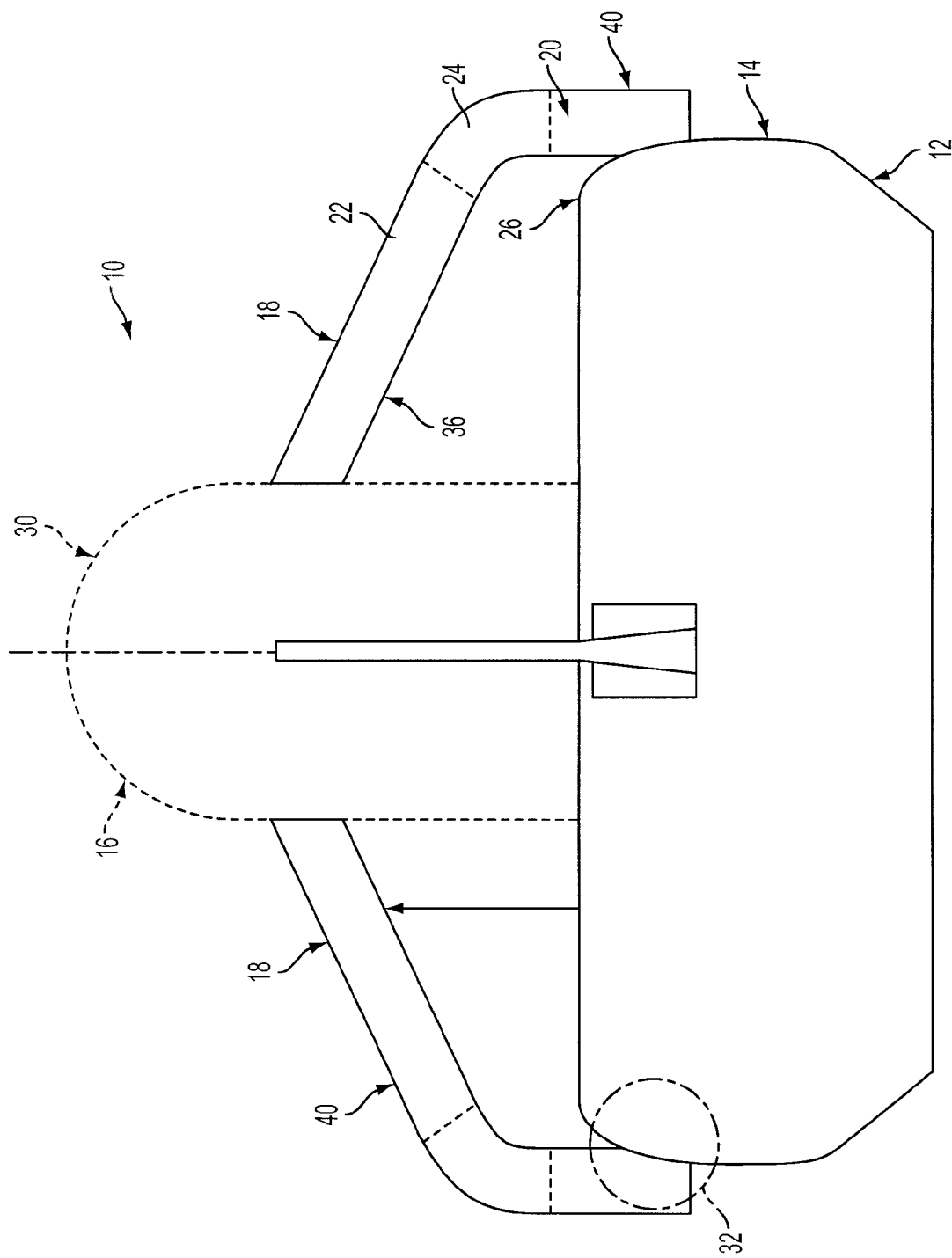
FIG. 1 is a side view of the strut support system in which the second leg is at an angle greater than 90 degrees.

In one aspect, as shown in FIGS. 1-4, the present invention provides a strut support system 10 for a ducted fan unmanned aerial vehicle 12 to suppress noise comprising: (a) a ducted fan fuselage 14 that defines an opening 42 (b) a centerbody 16 that extends longitudinally through the opening 42 in the fuselage 14, wherein the centerbody 16 comprises (1) an engine, (2) a drive mechanism rotatably mounted to the engine, and (3) a fan mounted on the drive mechanism, and (c) a plurality of struts 18 extending between the ducted fan fuselage 14 and the centerbody 16, each comprising a first leg 20 and a second leg 22 joined together by a curvilinear junction 24, wherein the first leg 20 is attached to the ducted fan fuselage 14 and the second leg 22 is attached to the engine, wherein the plurality of struts 18 are positioned upstream of the fan, and wherein the junction 32 between the first leg 20 of each of the plurality of struts 18 and the ducted fan fuselage 14 is outside the highlight 26 of the ducted fan fuselage's leading edge 28.

As used herein, the ducted fan fuselage 14 is any type of ducted fan fuselage known in the art and preferably has an inner diameter (ID) less than or equal to 60 inches.

As used herein, the engine is any type of engine known in the art. The engine is covered by an aerodynamically shaped cowl 30 to reduce drag. The outer diameter (OD) of the engine scales to the ID of the ducted fan fuselage 14 at a ratio of approximately 1:4. For example, if the ducted fan fuselage 14 has an ID of 32 inches, the OD of the engine is approximately 8 inches.

As used herein, the drive mechanism is any type of prop shaft known in the art. The engine remains stationary and drives the prop shaft at high speeds, which in turn drives the fan mounted on the prop shaft to obtain the needed lift for the unmanned aerial vehicle 12 to fly. The OD of the prop shaft scales to the ID of the ducted fan fuselage 14 in an approximate 1:4 ratio. In addition, the OD of the engine cowl 30 is typically larger than the OD of the prop shaft to prevent the prop shaft from being exposed to the outside air. Alternatively, the vehicle could be powered by direct gearing or a drive belt rather than by a prop shaft.

As used herein, each of the plurality of struts 18 is preferably composed of a single molded piece, though multi-piece struts could also be employed. Multi-piece struts are not preferred since the joints weaken the strut system 10. The preferred material for the plurality of struts 18 is aluminum, though use of other metals, alloys, or plastics is contemplated.

As used herein, the first leg 20 of each of the plurality of struts 18 is attached to the ducted fan fuselage 14 and extends in a substantially straight line until it meets the curvilinear junction 24 of the strut. As used herein, the curvilinear junction 24 of the strut provides a smooth, aerodynamic transition from the first leg 20 into the second leg 22 of the strut. The curvilinear junction 24 begins at the point where the longitudinal axis of the first leg 20 is no longer linear and the junction 24 continues until it meets the linear longitudinal axis of the second leg 22. The second leg 22 of the strut extends from the curvilinear junction 24, passes through the engine cowl 30, and attaches to the engine's housing. Alternatively, the first leg 20 and second leg 22 could meet at a sharp angle provided that a fairing, with a curvilinear junction 26 to accommodate this sharp angle, covers the strut.

As used herein, the plurality of struts 18 are positioned upstream of the fan, which allows for the strut wake strength to be reduced at the plane of the fan since the wake dissipates through mixing as it moves downstream.

As used herein, the leading edge 28 of the ducted fan fuselage 14 is the top surface of the duct 14 when the UAV 12 is at rest and the highlight 26 is the most forward position of the leading edge 28. Placing the junction 32 between the first leg 20 of each of the plurality of struts 18 and the ducted fan fuselage 14 outside the highlight 26 of the ducted fan fuselage's leading edge 28 further eliminates noise from the strut-fan interaction. This is due to the fact that airflow velocity is lower outside the duct's highlight 26 than it is at the inside surface 34 of the duct, where air is accelerated due to the curvature of the leading edge 28. Lower airflow velocity at the strut-duct junction 32 results in weaker counter-rotating vortices, which in turn result in less noise when vortices interact with the downstream fan. Additionally, lower velocity airflow at the strut-duct junction 32 results in smaller and weaker wakes downstream of the plurality of struts 18 resulting in less noise when the wakes interact with the downstream fan.

In one embodiment, the profile of each of the plurality of struts is aerodynamically shaped. As used herein, a NACA 0024 strut profile or cross-section is preferred. However, there are many variations of airfoil profiles, any of which could be used for the claimed strut system. The important consideration in selecting an appropriate profile is the compromise between low drag and the ability to accommodate wide variations in flow directed at the profile's leading edge 40.

In one embodiment, a leading edge 40 of the strut is rounded in cross-section relative to the trailing edge 36 of the strut, which forms a sharp edge in cross-section. The leading edge 40 faces outward away from the UAV, whereas the trailing edge 36 faces inward towards the fan and the engine. The leading and trailing edges 28, 36 are interconnected by the smooth lines of the contours of the outer-facing and inner-facing surfaces. In this embodiment, the ratio of thickness to chord length is consistent along the length of the strut beginning at the highlight 26 of the ducted fan fuselage 14 and ending at the engine. The ratio between this thickness and the chord length provides a strut surface that is convex on opposing sides of the chord with a thickness that is wider toward the leading edge 40 and tapers toward the trailing edge 36.

In one embodiment, a trailing edge 36 along the length of the first leg 20 of each of the plurality of struts 18 remains outside the circumference of the duct's highlight 26 until the point at which the first leg 20 meets the curvilinear junction 24. This means that the first leg 20 of the strut is substantially vertical along its length. Alternatively, the first leg 20 could be sufficiently displaced outside the highlight 26 of the duct so as to accommodate a slight angle of the first leg 20 towards the engine such that the first leg 20 does not extend over the highlight 26 until it meets the curvilinear junction 24 of the strut. Another possibility is that the first leg 20 slants up to 30 degrees from the vertical away from the centerbody 16 (not shown) such that the first leg 20 never extends over the highlight 26.

Figure 2:
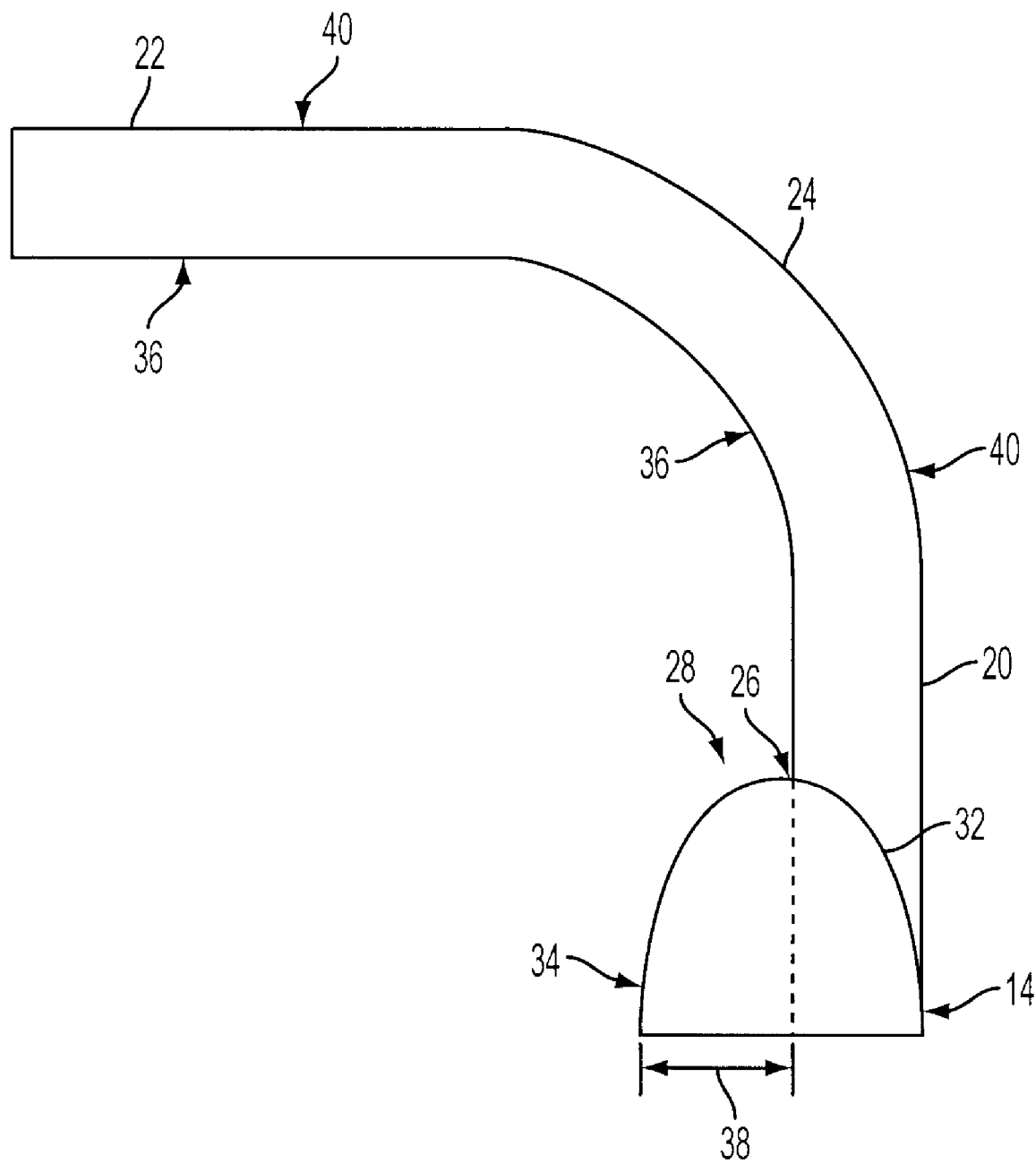
FIG. 2 is a side view of the strut support system in which the second leg is substantially perpendicular to the first leg.
Figure 3:
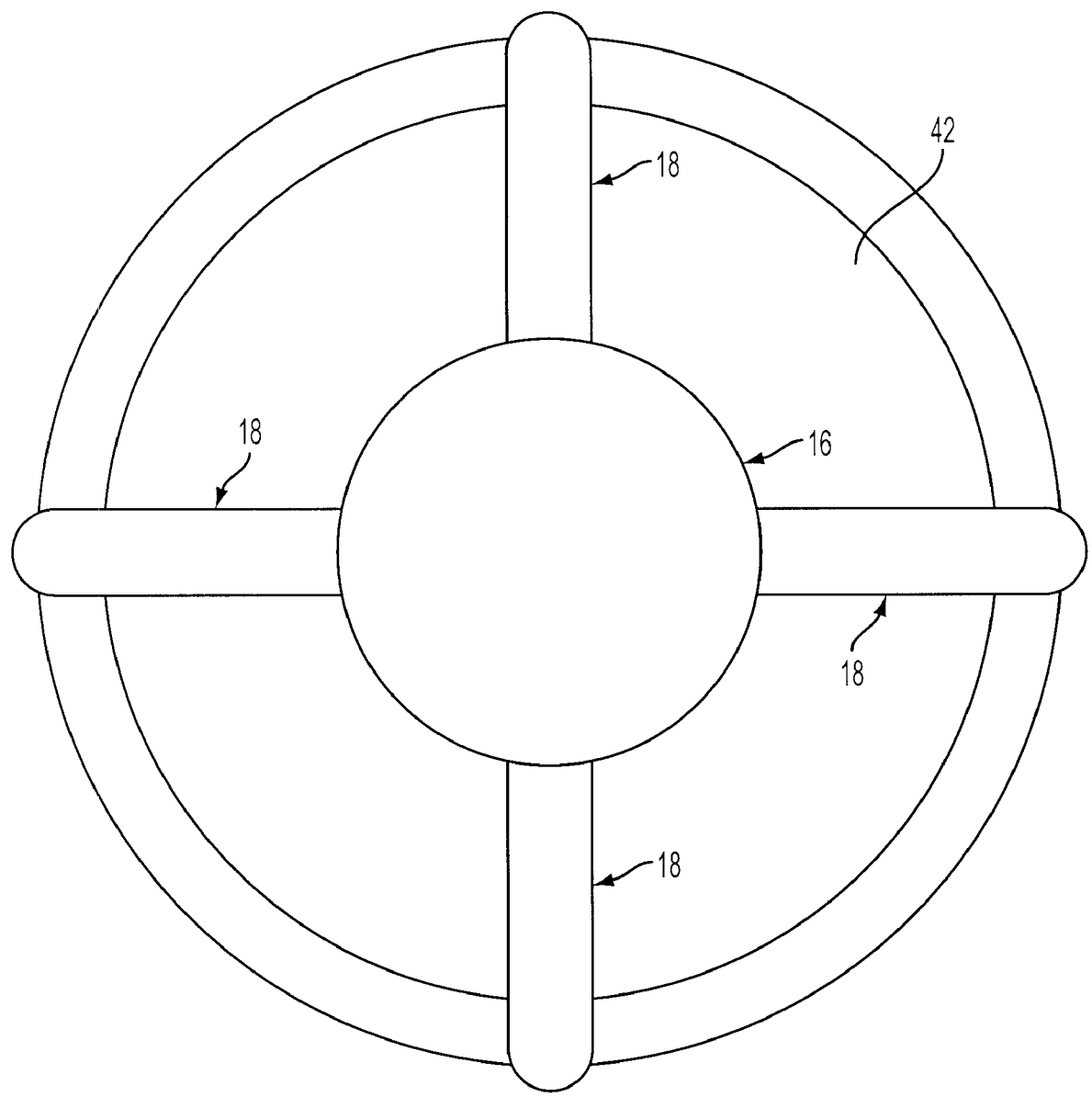
FIG. 3 is a top view of the strut support system.

In one embodiment, as shown in FIG. 2, the first leg 20 and the second leg 22 are substantially perpendicular to each other. As used herein, the first leg 20 is substantially parallel to the longitudinal axis of the centerbody 16.

In one embodiment, the ratio of the length of the first leg 20 to the length of the second leg 22 is approximately 1:2, when the second leg 22 is substantially perpendicular to the first leg 20. The ultimate lengths of the first and second legs 20, 22 depend on the size of the ducted fan fuselage ID. For example, in a case where the ID of the ducted fan fuselage 14 is 32 inches and the OD of the engine is 8 inches, the length of the second leg 22 must be at least 24 inches plus the distance from the inside of the duct to the leading edge of the duct 38 to ensure the first leg 20 is outside the duct highlight 26. In this example, the length of the first leg 20 would be approximately half the length of the second leg 22.

In one embodiment, the thickness of the profile of each of the plurality of struts 18 is thinnest near the highlight 26 of the ducted fan fuselage 14 and widest near the engine. A thinner strut near the highlight will further reduce the strut's wake, leading to reduced rotor/wake interactions and therefore less noise. Additionally, by tapering the struts in this manner, total vehicle weight can be reduced.

Figure 4B:
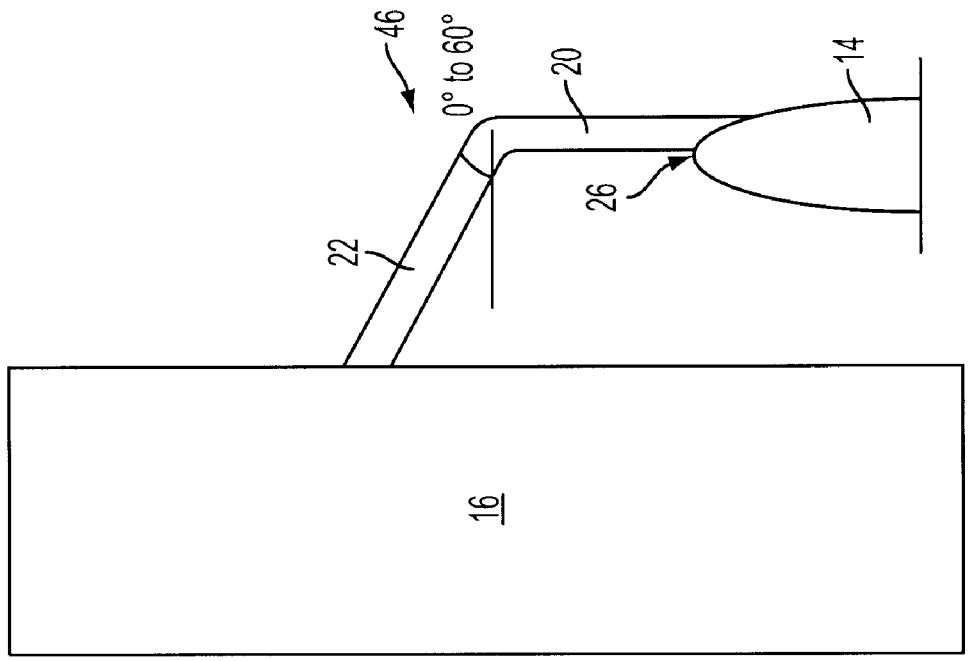
FIG. 4b is a side view of the strut support system illustrating 60 degrees of sweep in the aft direction.
Figure 4A:
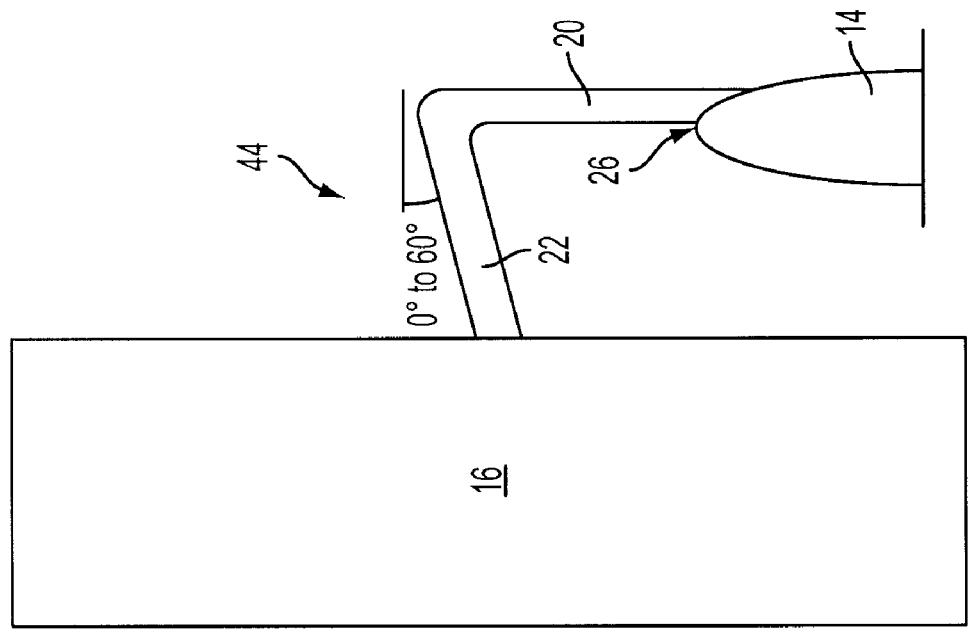
FIG. 4a is side view of the strut support system illustrating 60 degrees of sweep in the forward direction.

In one embodiment, the second leg 22 has forward sweep 44 in the range of 0 to 60 degrees. A sweep of 0 degrees means there is essentially no sweep and the leading edge 40 of the second leg 22 is substantially perpendicular to the longitudinal axis of the centerbody 16 when the UAV 12 is at rest. As shown in FIG. 4a, as the angle of forward sweep 44 increases towards 60 degrees the attachment point of the second leg 22 to the engine housing moves closer to the fan.

In one embodiment, the second leg 22 has aft sweep 46 in the range of 0 to 60 degrees. A sweep of 0 degrees means there is essentially no sweep and the leading edge 40 of the second leg 22 is substantially perpendicular to the longitudinal axis of the centerbody 16 when the UAV 12 is at rest. As shown in FIG. 4b, as the angle of aft sweep 46 increases towards 60 degrees the attachment point of the second leg 22 to the engine housing moves farther away from the fan.

In one embodiment, each of the plurality of struts 18 has a lean in the range of 0 to 20 degrees. When the struts extend radially from the centerbody, the struts have 0 degrees of lean. The struts may bend up to 20 degrees in the clockwise or counterclockwise direction from this 0 degree radial position. Ultimately, lean is set by acoustic considerations.

In one embodiment, each of the plurality of struts 18 has substantially no lean. It is preferred for the struts 18 to have no lean.

As used herein, all the foregoing descriptions and embodiments with respect to the strut support system 10 may be combined with other embodiments.

The invention claimed is:

1. A strut support system for a ducted fan unmanned aerial vehicle, the strut support system comprising:
   a ducted fan fuselage that defines an opening;
   a centerbody that extends longitudinally through the opening in the fuselage, wherein the centerbody comprises an engine, a drive mechanism rotatably mounted to the engine, and a fan mounted on the drive mechanism; and
   a plurality of struts extending between the ducted fan fuselage and the centerbody, each strut comprising a first leg and a second leg joined together by a curvilinear junction, wherein the first leg is attached to the ducted fan fuselage and the second leg is attached to the engine, wherein the plurality of struts are positioned upstream of the fan, and wherein the junction between the first leg of each strut of the plurality of struts and the ducted fan fuselage is outside a highlight of a leading edge of the ducted fan fuselage.

2. The strut support system of claim 1, wherein a trailing edge along a length of the first leg of each strut of the plurality of struts remains outside a circumference of the highlight of the leading edge of the ducted fan fuselage until a point at which the first leg meets the curvilinear junction.

3. The strut support system of claim 1, wherein the first leg and the second leg are substantially perpendicular to each other.

4. The strut support system of claim 1, wherein a ratio of the length of the first leg to the length of the second leg is approximately 1:2.

5. The strut support system of claim 1, wherein a profile of each strut of the plurality of struts is aerodynamically shaped.

6. The strut support system of claim 1, wherein a leading edge of each strut is rounded in cross-section relative to a trailing edge of the strut, which forms a sharp edge in cross-section.

7. The strut support system of claim 1, wherein a thickness of a profile of each strut of the plurality of struts is thinnest near the highlight of the leading edge of the ducted fan fuselage and widest near the engine.

8. The strut support system of claim 1, wherein each strut of the plurality of struts has a lean in the range of 0 to 20 degrees.

9. The strut support system of claim 8, wherein each strut of the plurality of struts has substantially no lean.

10. The strut support system of claim 1, wherein the second leg has forward sweep in the range of 0 to 60 degrees.

11. The strut support system of claim 10, wherein a profile of each strut of the plurality of struts is aerodynamically shaped.

12. The strut support system of claim 10, wherein a leading edge of each strut is rounded in cross-section relative to a trailing edge of the strut, which forms a sharp edge in cross-section.

13. The strut support system of claim 10, wherein a width of the profile of each strut of the plurality of struts is thinnest near the highlight of the leading edge of the ducted fan fuselage and widest near the engine.

14. The strut support system of claim 10, wherein each strut of the plurality of struts has a lean in the range of 0 to 20 degrees.

15. The strut support system of claim 1, wherein the second leg has aft sweep in the range of 0 to 60 degrees.

16. The strut support system of claim 15, wherein a profile of each strut of the plurality of struts is aerodynamically shaped.

17. The strut support system of claim 15, wherein a leading edge of each strut is rounded in cross-section relative to the trailing edge of the strut, which forms a sharp edge in cross-section.

18. The strut support system of claim 1, wherein a width of a profile of each strut of the plurality of struts is thinnest near the highlight of the leading edge of the ducted fan fuselage and widest near the engine.

19. The strut support system of claim 18, wherein each strut of the plurality of struts has a lean in the range of 0 to 20 degrees.

20. The strut support system of claim 19, wherein each strut of the plurality of struts has substantially no lean.

* * * * *